(12) United States Patent
Marcial-Simon et al.

(10) Patent No.: US 10,780,792 B2
(45) Date of Patent: Sep. 22, 2020

(54) METHOD FOR CONTROLLING THE ELECTRIC CHARGING PROCESS OF A GROUP OF VEHICLES IN THE EVENT OF A POWER REDUCTION

(71) Applicant: Bayerische Motoren Werke Aktiengesellschaft, Munich (DE)

(72) Inventors: Enrique Marcial-Simon, Veitshoechheim (DE); Rainer Mehlhorn, Landsham (DE); Xaver Pfab, Herdweg (DE); Thomas Stauner, Unterschleissheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 120 days.

(21) Appl. No.: 16/239,293

(22) Filed: Jan. 3, 2019

(65) Prior Publication Data

US 2019/0135134 A1    May 9, 2019

Related U.S. Application Data

(63) Continuation of application No. PCT/EP2017/061017, filed on May 9, 2017.

(30) Foreign Application Priority Data

Jul. 4, 2016   (DE) .................. 10 2016 212 135

(51) Int. Cl.
    *G05B 19/042*     (2006.01)
    *B60L 53/63*      (2019.01)
    (Continued)

(52) U.S. Cl.
    CPC ............ *B60L 53/63* (2019.02); *B60L 53/64* (2019.02); *B60L 53/68* (2019.02); *G05B 19/042* (2013.01);
    (Continued)

(58) Field of Classification Search
    CPC ...... H02J 3/14; H02J 2310/14; H02J 2310/12; H02J 2310/48; H02J 3/322; Y04S 30/12;
    (Continued)

(56) References Cited

U.S. PATENT DOCUMENTS

2010/0017249 A1   1/2010 Fincham et al.
2013/0002188 A1   1/2013 Uyeki
(Continued)

FOREIGN PATENT DOCUMENTS

DE    10 2011 105 417 A1   12/2012
DE    10 2011 109 422 A1    2/2013
(Continued)

OTHER PUBLICATIONS

PCT/EP2017/061017, International Search Report dated Aug. 23, 2017 (Three (3) pages).
(Continued)

*Primary Examiner* — Michael J Brown
(74) *Attorney, Agent, or Firm* — Crowell & Moring LLP (57) ABSTRACT

In connection with an electric charging process of vehicles electrically connected to a power supply system operated by a power supply system operator, one or more parameters to be adhered to for a charging operation of the vehicles are defined and a user of a vehicle can alter at least one of the parameters via a user interface. A central control system is configured to communicate with the vehicles and with a server of the power supply system operator. A method includes performing a power reduction operation in accordance with a reduction scheme in response to a received reduction command. In the event that, after receiving the reduction command and prior to or during the power reduction operation, the user alters at least one of the one or more parameters such that the charging operation of the energy storage device of the respective vehicle is altered, the (Continued)

method further includes checking, by the central control system, whether a preset criterion has been met. In the event that the preset criterion has been met, the method further includes beginning or continuing the power reduction operation in accordance with the reduction scheme for the respective vehicle while adhering to the one or more altered parameters of the altered charging operation.

17 Claims, 3 Drawing Sheets

(51) Int. Cl.
*B60L 53/68* (2019.01)
*B60L 53/64* (2019.01)
*B60L 53/66* (2019.01)
*H02J 3/14* (2006.01)
*B60R 16/03* (2006.01)
*B60W 10/26* (2006.01)
*B60W 20/00* (2016.01)

(52) U.S. Cl.
CPC ........... *B60L 53/66* (2019.02); *B60L 2240/70* (2013.01); *G05B 2219/2639* (2013.01); *Y02E 60/721* (2013.01); *Y02T 10/7005* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/163* (2013.01); *Y02T 90/169* (2013.01); *Y04S 10/126* (2013.01); *Y04S 30/14* (2013.01)

(58) Field of Classification Search
CPC ................... Y04S 10/126; Y04S 30/14; G05B 2219/2639; G05B 19/042; G06F 1/3203; B60R 16/03; B60W 10/26; B60W 20/00; B60L 53/63; B60L 53/68; B60L 53/64; B60L 53/66; B60L 2240/70; Y02E 60/721; Y02T 10/7005; Y02T 10/7072; Y02T 10/7291; Y02T 90/121; Y02T 90/128; Y02T 90/14; Y02T 90/16; Y02T 90/163; Y02T 90/169
USPC .......................................... 700/22, 286, 295
See application file for complete search history.

(56) References Cited

U.S. PATENT DOCUMENTS

| | | |
|---|---|---|
| 2014/0184156 A1 | 7/2014 | Sutardja |
| 2015/0077054 A1 | 3/2015 | Uyeki |
| 2016/0243956 A1* | 8/2016 | Yuan ..................... B60L 53/14 |

FOREIGN PATENT DOCUMENTS

| | | |
|---|---|---|
| DE | 11 2012 005 488 T5 | 10/2014 |
| DE | 10 2014 206 381 A1 | 10/2015 |
| DE | 11 2014 001 783 T5 | 12/2015 |
| EP | 2 875 986 A1 | 5/2015 |

OTHER PUBLICATIONS

German Search Report issued in German counterpart application No. 10 2016 212 135.9 dated Feb. 22, 2017, with Statement of Relevancy (Ten (10) pages).

* cited by examiner

METHOD FOR CONTROLLING THE ELECTRIC CHARGING PROCESS OF A GROUP OF VEHICLES IN THE EVENT OF A POWER REDUCTION

CROSS REFERENCE TO RELATED APPLICATIONS

This application is a continuation of PCT International Application No. PCT/EP2017/061017, filed May 9, 2017, which claims priority under 35 U.S.C. § 119 from German Patent Application No. 10 2016 212 135.9, filed Jul. 4, 2016, the entire disclosures of which are herein expressly incorporated by reference.

BACKGROUND AND SUMMARY OF THE INVENTION

The invention relates to a method for controlling the electric charging process of a group of vehicles and a corresponding control system.

It is known from the prior art to control the charging of the energy storage devices in a group or pool of electrically drivable vehicles by means of a control system in such a way that requirements of the operator of the power supply system used for charging in respect of a power reduction are also taken into consideration. In this case, a power reduction operation in accordance with a reduction scheme which specifies a reduction in the charging power of the charging operation of the energy storage devices of vehicles in the vehicle pool by temporarily suspending the charging operation is performed by the control system. Without initialization of a power reduction operation, parameters to be adhered to for the charging of the energy storage devices of the individual motor vehicles are preset. For vehicles which participate in a power reduction operation, it is possible for a deviation to be made, if appropriate, from these parameters of the charging operation.

In general, at least some of the parameters of the charging operation of the energy storage device of a vehicle can be altered manually by an assigned user using a user interface. Since, under certain circumstances, it is not desirable to the user of a vehicle for a deviation to be made from these parameters, it is known from the prior art that the user can block participation of his vehicle in a power reduction operation (so-called opt-out). Furthermore, it may occur that, during or shortly prior to the performance of a power reduction operation, the parameters of a vehicle participating in this operation are altered by the user. Conventionally, this results in the vehicle in question then no longer participating in the power reduction operation. However, this has the disadvantage that, owing to the removal of the vehicle, the reduction scheme for the power reduction operation needs to be recalculated again, with computational resources in the central control system being required for this purpose.

Generally, users of motor vehicles are rewarded for participation in corresponding power reduction operations by means of a reward system. For example, the users can receive financial remuneration for this. As already mentioned above, the vehicle of a user does, however, automatically cease to participate in a power reduction operation when the user manually alters parameters of the charging operation in an imminent or already begun power reduction operation. Therefore, the user has no incentives to choose manual alterations to parameters of the charging operation for his vehicle such that his vehicle continues to participate in the power reduction operation.

An object of the invention is to configure the control of the electric charging of a group of vehicles with the possibility of a power reduction operation more simply.

The method according to the invention is used for controlling the electric charging process of a group of vehicles which are electrically connected to a power supply system of a power supply system operator, wherein the respective vehicles draw current from the power supply system for charging a vehicle-side energy storage device for driving the respective vehicle. In other words, the vehicles are electrically drivable vehicles such as, for example, purely electric vehicles or hybrid vehicles. In the method according to the invention, one or more parameters to be adhered to for the charging operation of the vehicle-side energy storage device of the respective vehicles are defined in advance. In this case, a user of a respective vehicle can alter at least some of these parameters using a respective user interface. Preferred embodiments of the mentioned parameters will be described further below. Inter alia, the parameters can specify, for example, a desired departure time of the vehicle or a time window in which charging of the corresponding vehicle is intended to take place.

In the method according to the invention, a central control system can communicate with the respective vehicles in the group and with a server of the power supply system operator. A central control system is in this case understood to mean a control system or a control device which controls the charging of all of the vehicles in the group. This control system is implemented in particular using software on a corresponding server. The parameters to be adhered to or an alteration to these parameters are in this case known to the central control system. For example, they are communicated to the central control system via a wireless communications interface which is linked to the above user interface.

In the method according to the invention, the central control system performs a power reduction operation in accordance with a reduction scheme in response to a received reduction command. In the event that, after reception of the above reduction command and prior to or during the power reduction operation on the basis thereof, the charging operation of the energy storage device of at least one preset vehicle is altered by the user by means of altering at least one of its parameters, the central control system performs a check, as part of the method according to the invention, to ascertain whether a preset criterion has been met. If no mention is made to the contrary, the at least one preset vehicle is understood here and in the text which follows to mean a vehicle in which parameters of the charging operation are altered prior to or during the power reduction operation. In accordance with the invention, therefore, the central control system performs a check to ascertain whether the adherence to a parameter alteration specified by the user has any negative effects on the power reduction operation in the sense that the desired power reduction in accordance with the power amount of the received reduction command is no longer continuously being achieved.

If the criterion preset above has been met, i.e. if the adherence to the parameters for the at least one preset vehicle does not have any negative effects on the power reduction operation, the power reduction operation in accordance with the reduction scheme with the participation of the at least one preset vehicle in the power reduction operation and whilst adhering to the parameter(s) of the altered charging operation is begun or continued by the central control system.

The method according to the invention has the advantage that, in the case of manual parameter alterations of charging operations, an already calculated reduction scheme can be maintained if the altered parameters do not have any negative effects on the power reduction operation such that, when these parameters are adhered to, the desired power reduction cannot be continuously achieved. The alteration of parameters therefore does not necessarily result in calculation of a new reduction scheme, as a result of which savings are made on computational resources in the central control system. Furthermore, in combination with a reward system in which a user is rewarded for participation in a power reduction operation, user behavior can be positively influenced since users have an incentive to take care when manually altering parameters of the charging operation for his vehicle that the alteration to the parameters does not result in the vehicle no longer participating in the power reduction operation.

In accordance with an advantageous configuration, the reduction command can in this case originate from the server of the power supply system operator and define a power amount by which the power uptake of the group of vehicles from the power supply system needs to be decreased. The reduction scheme can be determined or calculated by the central control system on the basis of the power amount of the reduction command. This determined or calculated reduction scheme can specify a temporary reduction in the charging power of the charging operation of the energy storage device of one or more preset vehicles in the group, with the result that the decrease in the power uptake of the group of vehicles by the power amount in accordance with the received reduction command is achieved. The term 'temporary reduction in the charging power' should be understood broadly and can also include, in addition to a temporary lowering of the charging power to a value greater than zero, temporary suspension of the charging operation, i.e. setting of the charging power to zero. Likewise, the reduction in the charging power can go beyond suspension of the charging operation and result in temporary discharge of the corresponding energy storage device. The discharge power of this temporary discharge can in this case be considered as a power value which contributes to the decrease in the power uptake. The preset vehicle(s) just defined is or are vehicles from the group for which participation in the power reduction operation is permitted, i.e. participation of said vehicles is not blocked (for example by a user). Within the scope of the power reduction operation, in this case a deviation from the predefined parameter(s) of the charging operation of the preset vehicles can be allowed. Generally, when determining the reduction scheme, however, computation rules are used which keep a deviation from the parameters and therefore the effects for the user as small as possible. Hereby, more efficient and/or simpler control of the charging operation can be achieved.

In accordance with a further, advantageous configuration, the preset criterion can in this case be defined in such a way that said criterion has been met when the adherence to the parameter(s) of the altered charging operation does not shorten the temporary reduction in the charging power of the charging operation of the energy storage device of the at least one preset vehicle in accordance with the reduction scheme. Hereby, more efficient and/or more flexible control of the charging operation can be achieved.

In accordance with a further, advantageous configuration, if the preset criterion has not been met, a new reduction scheme can be determined by the central control system on the basis of the power amount of the received reduction command without the participation of the at least one preset vehicle, whereupon the power reduction operation in accordance with the new reduction scheme is begun by the central control system. Hereby, more efficient and/or more flexible control of the charging operation can be achieved.

Depending on the configuration of the method according to the invention, the parameters of a charging operation of the energy storage device of a respective vehicle which are alterable by a user can include one or more of the following parameters:

a time window in which the energy storage device of the respective vehicle needs to be charged, for example a time window in which the electricity costs are low, wherein charging outside of the time window is also not ruled out;

a power value with which the energy storage device of the respective vehicle needs to be charged and/or a maximum power value with which the energy storage device of the respective vehicle is intended to be maximally charged;

a departure time of the respective vehicle, wherein a preset setpoint state of charge of the energy storage device of the respective vehicle needs to be achieved at the departure time;

information relating to preconditioning which defines a quantity of electrical energy required by the respective vehicle before a departure time is reached, for example a quantity of energy of a heating system or an air-conditioning system which is intended to be activated prior to the departure time;

information in accordance with which charging of the energy storage device of the respective vehicle is intended to be begun immediately on connection of the vehicle to the power supply system and continued until a setpoint state of charge is achieved;

a setpoint state of charge which needs to be achieved by a departure time of the respective vehicle or up to which the respective vehicle charges maximally without specification of a departure time.

In a further embodiment of the method according to the invention, in the event that the preset criterion has been met, the control system in addition ensures that the power reduction operation in accordance with the reduction scheme with the participation of the at least one preset vehicle in the power reduction operation and whilst adhering to the parameter(s) of the altered charging operation is no longer (automatically) manipulated by the central control system in such a way that the altered charging operation is altered again. This variant of the invention achieves a situation whereby the desire of the user in respect of alteration of parameters is always adhered to.

In a further preferred embodiment of the method according to the invention, the central control system, when performing a check to ascertain whether the preset criterion has been met, takes into consideration a buffer, which assumes a charging efficiency of the energy storage device of the at least one preset vehicle which has been decreased in comparison with an expected charging efficiency in order to prevent the decrease in the power uptake of the group of vehicles in accordance with the reduction scheme with the participation of the at least one preset vehicle in the power reduction operation and whilst adhering to the parameter(s) of the altered charging operation being lower than the power amount in accordance with the received reduction command. In this way, any fluctuations during charging are taken into consideration such that, even when these fluctuations occur, the preset of a power decrease by the power amount of the reduction command has been met.

In a preferred variant, the central control system, on every determination of a reduction scheme, takes into consideration a buffer which assumes a charging efficiency of the energy storage device of the respective preset vehicles which has been decreased in comparison with an expected charging efficiency in order to prevent the decrease in the power uptake of the group of vehicles in accordance with the reduction scheme being lower than the power amount in accordance with the received reduction command.

In a further embodiment of the method according to the invention, a stationary energy storage device system is connected to the power supply system. This stationary energy storage device system is preferably a stationary battery storage device and is actuated by the central control system in such a way that in the event that the decrease in the power uptake of the group of vehicles by the power amount in accordance with the reduction command cannot be achieved exclusively by the temporary reduction in the charging power of the energy storage device of preset vehicles in the group, the power uptake of the stationary energy storage device system from the power supply system is lowered or the power output of the stationary energy storage device system to the power supply system is increased, with the result that the decrease in the power uptake of the group of vehicles which is achieved by a temporary reduction in the charging power of the charging operation of the energy storage device of preset vehicles in the group plus the amount by which the power uptake of the stationary energy storage device system is lowered or by which the power output of the stationary energy storage device system is increased corresponds to the power amount in accordance with the reduction command. With this variant of the invention, an insufficient power decrease of vehicle-side energy storage devices is compensated for by a stationary energy storage device system.

In a further variant of the method according to the invention, a respective user interface by means of which a user of a respective vehicle can alter at least some of the parameters of the charging operation is part of a mobile (i.e. portable) device, such as, for example, a mobile telephone, a tablet or a laptop. Likewise, the user interface can be integrated in the respective vehicle. In this way, the user can adapt his preferences with respect to the charging of the vehicle-side energy storage device flexibly at any desired location or in the vehicle.

In addition to the above-described method, the invention relates to a central control system for controlling the electric charging process of a group of vehicles which are electrically connected to a power supply system of a power supply system operator, wherein the respective vehicles draw current for charging a vehicle-side energy storage device for driving the respective vehicle. In this case, one or more parameters to be adhered to for the charging operation of the energy storage device of the respective vehicles are defined, and the user of a respective vehicle can alter at least some of these parameters using a respective user interface. The central control system can communicate with the respective vehicles and with a server of the power supply system operator. The central control system is configured in such a way that it can implement the method according to the invention or one or more preferred variants of the method according to the invention.

Exemplary embodiments of the invention will be described in detail below with reference to the attached figures, in which:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
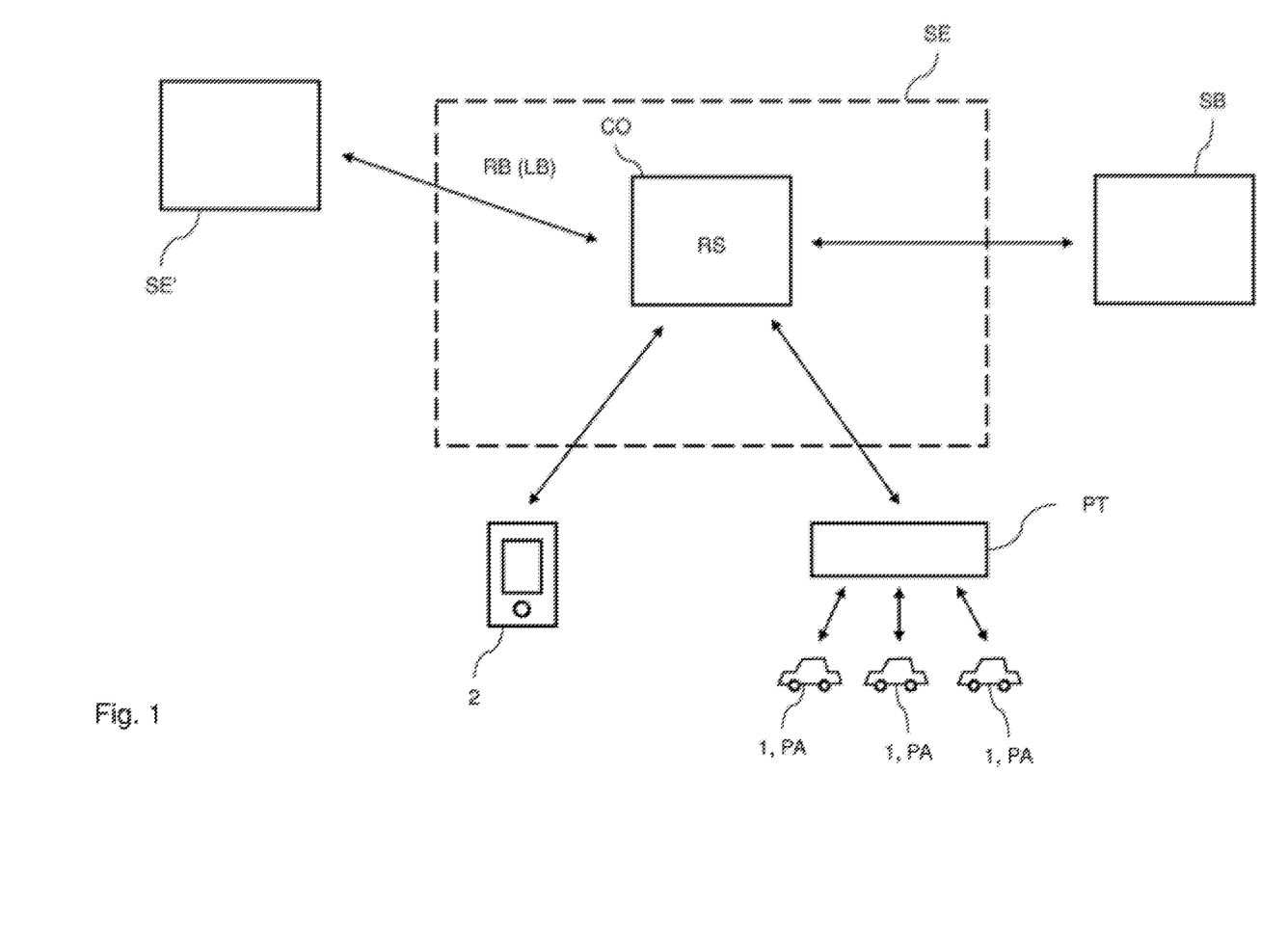
FIG. 1 shows a schematic illustration of an infrastructure in which an embodiment of the method according to the invention is implemented.

FIG. 1 shows a schematic illustration of an infrastructure for implementing the method according to the invention. A core constituent in this infrastructure is a central control unit CO which is integrated in a server SE and is used for controlling the charging of a fleet of a plurality of electrically driven vehicles (i.e. the drive batteries of these vehicles). If appropriate, the central control unit can also consist of a plurality of servers/modules/instances operating in parallel which are located at different locations in order to avoid a so-called "single point of failure". By way of example, three electric vehicles 1 from this fleet of vehicles are depicted. These vehicles are linked in terms of communications technology to the control unit CO via a portal PT. In addition, the vehicles 1 are connected to a power supply system (not shown) in order to charge the drive batteries of said vehicles using said power supply system. The control system CO has access to the portal PT via a suitable control backend (not shown), with it being possible in turn for said portal to communicate with the individual vehicles 1, for example by SMS. By means of the communication path via the portal PT, the control unit CO can transmit commands in respect of the temporary suspension of its charging operation on the basis of the reduction scheme RS described further below to the individual vehicles 1. If appropriate, commands in respect of the lowering of the charging power to a value greater than zero or in respect of performing a discharge operation can also be processed, wherein this type of command will not be considered below.

In each case parameters which are denoted generally by the reference symbol PA are stored in the individual vehicles 1. The parameters relate to the charging operations to be performed in the individual vehicles and should be adhered to as far as possible during charging of the vehicles. The parameters PA are also available to the control system CO. For example, the parameters can have been transmitted to the control system CO via the portal PT.

A user who has a smart phone 2 belongs to each individual vehicle 1, wherein, for reasons of clarity, only a single smart phone is indicated. The user can use this smart phone to communicate firstly with the control system CO via the control backend (not shown) and secondly with his vehicle via the portal PT. In particular, the user can alter the parameters PA of the charging operation of his vehicle using the smart phone, wherein this information is passed on firstly to the control system CO and secondly to the respective vehicle.

In the variant of the invention described here, the user can define, as parameter PA, inter alia, the future departure time at which the vehicle is intended to be brought into operation and how the setpoint state of charge of the drive battery is intended to be at this departure time. If appropriate, the user can also specify a so-called "immediate charging", in which the vehicle is intended to be charged uninterrupted immediately after connection to the power supply system up to a predetermined setpoint state of charge, wherein, in this case, it is not necessary for a departure time to be specified. If appropriate, the user can also define so-called preconditioning as a parameter. In the case of this preconditioning, a quantity of electrical energy required by the vehicle before the departure time is reached is specified. The quantity of energy is required, for example, for the heating system or the air-conditioning system of the motor vehicle, which is intended to already be activated prior to the departure time.

As shown in FIG. 1, the control system CO also communicates with a server SE', which belongs to a power supply system operator on whose power supply system the vehicles 1 in the fleet of vehicles or the batteries thereof are being charged. Furthermore, in the infrastructure in FIG. 1, an energy storage device system in the form of a stationary battery storage device SB is provided, which is can be actuated via the control system CO by means of a suitable interface and belongs to the operator of the control system CO. The operator of the control system is, for example, the manufacturer of the vehicles 1 in the fleet of vehicles.

One aim of the infrastructure shown in FIG. 1 consists in that the power supply system operator can send, via its server SE', reduction commands RB to the control system CO in the event of overload on its power supply system, whereupon the control system suitably suspends the charging of at least some of the vehicles 1 currently being charged for a preset suspension time span in order hereby to reduce the load on the power supply system. The suspension time span in the embodiment described here is fixedly preset and is one hour.

A power amount LB by which the power output from the power supply system to the charging vehicles 1 needs to be decreased by means of the control system CO is defined in the reduction command RB which is communicated by the server SE' to the control system CO. On the basis of this power amount LB, the control system CO determines a reduction scheme RS, which specifies for which of the vehicles 1 the charging operation should be temporarily suspended. Then, the power reduction operation in accordance with the reduction scheme is performed by the control unit CO, which gives corresponding commands to the individual vehicles, whose charging operation is then interrupted. In this sense, a power reduction operation on the basis of the reduction scheme RS is performed by means of the control system CO. In this power reduction operation, it is also possible, if appropriate, for there to be a deviation from the parameters PA of the charging operations which actually need to be adhered to, with the result that, under certain circumstances, preferences of the respective user of the vehicle are temporarily not taken into consideration. This may be disadvantageous for the individual user. Therefore, the user can specify, for example using his smart phone 2, that he or she does not wish to participate in power reduction operations (opt-out). However, in order not to bring the user into a situation whereby his vehicle participates in power reduction operations despite possible disadvantages, a suitable reward system is used, in accordance with which the user receives monetary compensation when he participates in power reduction operations.

It is now possible for the case to occur whereby the parameters PA of the charging operation of a vehicle which participates in an impending power reduction operation are altered in the short term by the user. In order to take account of this alteration, this vehicle is generally no longer taken into consideration in the impending power reduction operation, but, owing to the altered number of vehicles, this results in it being necessary for a new reduction scheme to be calculated by the control system CO. Furthermore, a user who alters corresponding parameters in the short term does not have any inducement whatsoever to configure this parameter alteration such that participation of his vehicle in the impending power reduction operation despite altered parameters is still possible. This is the case when, with the impending power reduction operation, it is still possible, despite altered parameters, for the power decrease by the power amount LB to be achieved.

In accordance with the invention, non-participation in the corresponding power reduction operation is now not automatically coupled with an alteration of parameters of the charging operation of a vehicle by a user. Instead, a check is first performed by the control system CO to ascertain whether the power reduction operation in accordance with the reduction scheme RS can be performed unaltered, whilst adhering to the altered parameters, in order to achieve the desired power decrease by the power amount LB of the reduction command RB. In other words, a check is performed by the control system to ascertain whether the adherence to the parameters of the altered charging operation does not shorten the temporary suspension of the charging operation in accordance with the reduction scheme for the energy storage device of the vehicle with the altered parameters. In the event that such shortening does not occur, the corresponding vehicle with the altered parameters continues to participate in the power reduction operation and the power reduction operation is performed in accordance with the reduction scheme RS. If, on the other hand, the suspension of the charging operation for the vehicle with the altered parameters is shortened, the control system CO calculates a new reduction scheme, to be precise without the participation of the vehicle with the altered parameters. In this way, it is always ensured that a decrease in the power drawn from the power supply system by the power amount of the reduction command is achieved. At the same time, however, the desires of the users in respect of an alteration of the parameters of a charging operation are also taken into consideration in a suitable manner.

Figure 2:
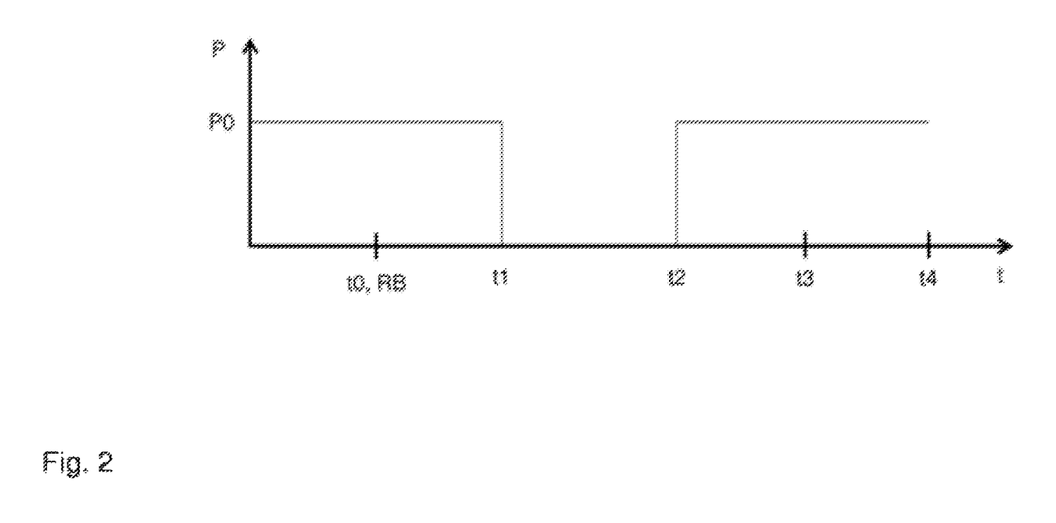
FIG. 2 and FIG. 3 show respective graphs which demonstrate, by way of example, scenarios in which the method according to the invention is used.
Figure 3:
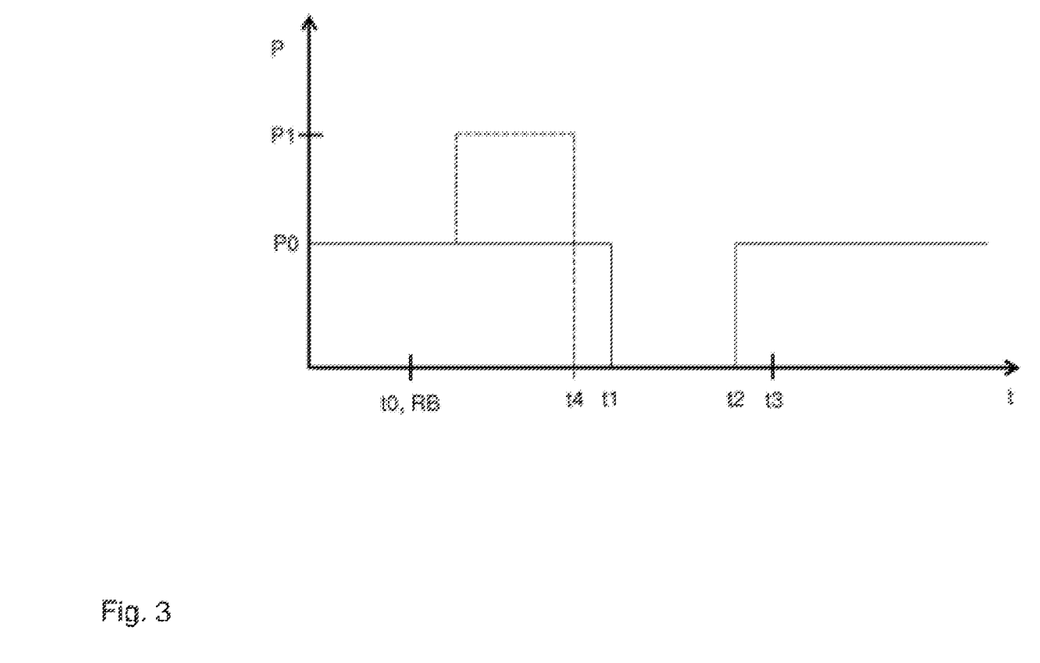

FIG. 2 and FIG. 3 show two scenarios in which the method according to the invention is used. Both figures show a graph in which time t is plotted on the x axis and the power uptake P by an energy storage device of a vehicle from FIG. 1 for which parameters of its charging operation are altered by a user is plotted on the y axis.

In accordance with FIG. 2, the vehicle was in the "immediate charging" state on connection to the power supply system. Accordingly, the vehicle should be charged with the power value P0 until a preset setpoint state of charge of its drive battery has been reached. At time t0, a reduction command RB was received by the server SE of the power supply system operator in the control system CO. Thereupon, the control system determines a reduction scheme for specifying the corresponding charge reduction operation. In the embodiment described here, the charging operation of the vehicle is intended to be suspended between times t1 and t2. This results in the setpoint state of charge of the drive battery being achieved at time t3. In the time span between t1 and t2, at the same time the charging operations of other vehicles are also suspended, with the result that a decrease in the power uptake of the group of vehicles by the power amount LB in accordance with the reduction command RB is achieved within the time span.

At a time between t0 and t1, the user now alters the parameters of the charging operation such that said user specifies a departure time t4 for his vehicle and additionally defines that the vehicle is intended to be charged in any case in a charging time window which begins after time t2 and ends prior to time t3. The control system CO now defines that the temporary suspension between times t1 and t2 can still be performed whilst adhering to the altered parameters of the charging operation since, owing to the temporary suspension between t1 and t2, the conditions are adhered to whereby charging takes place in the specified charging time window and the setpoint state of charge has been reached at the departure time t4. The vehicle with the altered parameter therefore continues to participate in the charging reduction operation. This would not be the case if the departure time were to be set to be so early that the setpoint state of charge can only be achieved at the departure time when the drive battery is also charged in the time window between t1 and t2. In this case, a new reduction scheme without the participation of the vehicle with the altered parameters would be calculated by the control system.

The graph in FIG. 3 shows a similar scenario to that shown in the graph in FIG. 2. The corresponding vehicle is again in the "immediate charging" state on connection to the power supply system. At time t0, a reduction command RB is received, whereupon a reduction scheme is determined, which results in temporary suspension of the charging operation of the vehicle in the time period between t1 and t2. The setpoint state of charge of the energy storage device is again achieved at time t3. In contrast to FIG. 2, in FIG. 3 at a time between t0 and t1 the power value used for charging, which is set from the value P0 to the value P1, as is indicated by the dashed line in FIG. 3, is altered as the parameter. In other words, in the "immediate charging" state, the power value with which the drive battery is intended to be charged is raised. As a consequence, the vehicle is already charged at the desired setpoint state of charge at time t4, which is prior to time t1. The control system CO now again defines that the increase in the power value to P1 does not have any negative influence on the temporary suspension of the charging operation, with the result that the vehicle can participate in the power reduction operation and the reduction scheme shown in the graph in FIG. 3 can be applied for the corresponding vehicle. This would not be the case if time t4 were not after time t1 since, in this case, the suspension of the charging operation would have to be shortened, which in turn would result in the power uptake of the vehicles not being decreased by the power amount LB continuously throughout the time span between t1 and t2.

The stationary battery storage device SB shown in FIG. 1 is only used in the embodiment described here when the power decrease specified by the command of the server SE' cannot be covered by the batteries of the vehicles in the vehicle pool. In this case, by virtue of a corresponding power uptake from the power supply system or power output to the power supply system, a situation is achieved whereby the desired decrease in the power on the power supply system results.

The embodiments of the invention described above have a number of advantages. In particular, depending on the context, the control system automatically determines whether a vehicle with altered parameters of its charging operation continues to participate in the corresponding charge reduction operation. In this sense, it is a context-dependent opt-out, which does not explicitly need to be performed by a user. When using a reward system in which a user is rewarded for participation in a power reduction operation, this method makes it possible for the user to be induced to manually alter parameters such that said user continues to participate in a power reduction operation. Conventionally, the user is excluded from participation in the power reduction operation each time the parameters are altered manually. The method according to the invention furthermore ensures that manually altered parameters are also adhered to as the vehicle continues to participate in the power reduction operation, and therefore the user's desire is complied with.

LIST OF REFERENCE SYMBOLS 1 vehicles
2 smart phone
CO central control system
SE, SE' server
SB stationary battery storage device
PT portal
RB reduction command
LB power amount
RS reduction scheme
t time of day
t1, t2, . . . , t4 times
P power
P0, P1 power values The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling the electric charging process of a plurality of vehicles which are electrically connected to a power supply system of a power supply system operator, wherein each of the plurality of vehicles draws current from the power supply system to charge a vehicle-side energy storage device of a corresponding one of the plurality of vehicles, wherein one or more parameters to be adhered to for a charging operation of the energy storage devices of the plurality of vehicles are defined, and a user of a respective vehicle of the plurality of vehicles can alter at least one of the one or more parameters via a user interface, wherein a central control system is configured to communicate with the plurality of vehicles and with a server of the power supply system operator, wherein performing, by the central control system, a power reduction operation in accordance with a reduction scheme in response to a received reduction command;

in the event that, after receiving the reduction command and prior to or during the power reduction operation, the user alters at least one of the one or more parameters such that the charging operation of the energy storage device of the respective vehicle is altered, the method further comprising checking, by the central control system, whether a preset criterion has been met; and in the event that the preset criterion has been met, the method further comprises beginning or continuing the power reduction operation in accordance with the reduction scheme for the respective vehicle while adhering to the one or more altered parameters of the altered charging operation.

2. The method as claimed in claim 1, wherein the method further comprises at least one of:

sending the reduction command from the server of the power supply system operator, and defining a power amount by which the power uptake of the plurality of vehicles from the power supply system needs to be decreased;

determining, by the central control system, the reduction scheme based on the power amount of the reduction command, wherein a temporary reduction in the charging power of the charging operation of the energy storage device of the respective vehicle is specified such that the decrease in the power uptake of the plurality of vehicles by the power amount in accordance with the received reduction command is achieved; and/or permitting participation in the power reduction operation for the respective vehicle, and a deviation from the one or more parameters of the charging operation of the respective vehicle is allowed for the power reduction operation.

3. The method as claimed in claim 1, wherein the preset criterion has been met when adhering to the one or more altered parameters does not shorten the temporary reduction in the charging power of the charging operation of the energy storage device of the respective vehicle in accordance with the reduction scheme.

4. The method as claimed in claim 1, wherein in the event that the preset criterion has not been met, the method further comprises determining a new reduction scheme by the central control system based on the power amount of the reduction command without participation of the respective vehicle, whereupon the power reduction operation in accordance with the new reduction scheme is begun by the central control system.

5. The method as claimed in claim 1, wherein the one or more parameters of the charging operation of the energy storage device of the respective vehicle which is alterable by the user includes one or more of the following parameters:
a time window in which the energy storage device of the respective vehicle needs to be charged;
a power value with which the energy storage device of the respective vehicle needs to be charged and/or a maximum power value with which the energy storage device of the respective one of the plurality of vehicles is intended to be maximally charged;
a departure time of the respective vehicle, wherein a preset setpoint state of charge of the energy storage device of the respective vehicle needs to be achieved at the departure time;
information relating to preconditioning which defines a quantity of electrical energy required by the respective vehicle before a departure time is reached;
information in accordance with which charging of the energy storage device of the respective vehicle is intended to be begun immediately on connection of the vehicle to the power supply system and continued until a setpoint state of charge is achieved; and/or
a setpoint state of charge which needs to be achieved by a departure time of the respective vehicle or up to which the respective vehicle charges maximally without specification of a departure time.

6. The method as claimed in claim 1, wherein in the event that the preset criterion has been met, the method further comprises ensuring that the power reduction operation in accordance with the reduction scheme with the participation of the respective vehicle in the power reduction operation, while adhering to the one or more altered parameter of the altered charging operation is no longer manipulated by the central control system such that the altered charging operation is altered again.

7. The method as claimed in claim 1, wherein the central control system, when performing a check to ascertain whether the preset criterion has been met, takes into consideration a buffer, which assumes a charging efficiency of the energy storage device of the respective vehicle which has been decreased in comparison with an expected charging efficiency in order to prevent the decrease in the power uptake of the plurality of vehicles in accordance with the reduction scheme with the participation of the respective vehicle in the power reduction operation, while adhering to the one or more altered parameter of the altered charging operation, being lower than the power amount in accordance with the received reduction command.

8. The method as claimed in claim 1, wherein a stationary energy storage device system is connected to the power supply system and is controlled by the central control system such that, in the event that the decrease in the power uptake of the plurality of vehicles by the power amount in accordance with the reduction command cannot be achieved exclusively by a temporary reduction in the charging power of the charging operation of the energy storage device of respective vehicles in the plurality of vehicles, the power uptake of the stationary energy storage device system from the power supply system is lowered or the power output of the stationary energy storage device system to the power supply system is increased, such that the decrease in the power uptake of the plurality of vehicles which is achieved by a temporary reduction in the charging power of the charging operation of the energy storage device of respective vehicles in the plurality of vehicles plus the amount by which the power uptake of the stationary energy storage device system is lowered or by which the power output of the stationary energy storage device system is increased corresponds to the power amount in accordance with the reduction command.

9. The method as claimed in claim 1, wherein the user interface by which the user of the respective vehicle can alter at least some of the one or more parameters of the charging operation is part of a mobile device or is integrated into the respective vehicle.

10. A central control system configured to control the electric charging process of a plurality of vehicles which are electrically connected to a power supply system of a power supply system operator, wherein each of the plurality of vehicles draws current for charging a vehicle-side energy storage device of a corresponding one of the plurality of vehicles, wherein one or more parameters to be adhered to for a charging operation of the energy storage device of the plurality of vehicles are defined, and a user of a respective vehicle of the plurality of vehicles can alter at least one of the one or more parameters via a user interface, wherein the central control system is configured to communicate with the plurality of vehicles and with a server of the power supply system operator, wherein the central control system is further configured to:
perform a power reduction operation in accordance with a reduction scheme in response to a received reduction command;
in the event that, after receiving the reduction command and prior to or during the power reduction operation, the user alters at least one of the one or more parameters such that the charging operation of the energy storage device of the respective vehicle is altered, check whether a preset criterion has been met; and
in the event that the preset criterion has been met, begin or continue the power reduction operation in accordance with the reduction scheme for the respective vehicle while adhering to the one or more altered parameter of the altered charging operation.

11. The central control system as claimed in claim 10, wherein the preset criterion has been met when adhering to the one or more altered parameters does not shorten the temporary reduction in the charging power of the charging operation of the energy storage device of the respective vehicle in accordance with the reduction scheme.

12. The central control system as claimed in claim 10, wherein in the event that the preset criterion has not been met, the central control system is further configured to determine a new reduction scheme by the central control system based on the power amount of the reduction command without participation of the respective vehicle, whereupon the power reduction operation in accordance with the new reduction scheme is begun by the central control system.

13. The central control system as claimed in claim 10, wherein the one or more parameters of the charging operation of the energy storage device of the respective vehicle which is alterable by the user includes one or more of the following parameters:
- a time window in which the energy storage device of the respective vehicle needs to be charged;
- a power value with which the energy storage device of the respective vehicle needs to be charged and/or a maximum power value with which the energy storage device of the respective one of the plurality of vehicles is intended to be maximally charged;
- a departure time of the respective vehicle, wherein a preset setpoint state of charge of the energy storage device of the respective vehicle needs to be achieved at the departure time;
- information relating to preconditioning which defines a quantity of electrical energy required by the respective vehicle before a departure time is reached;
- information in accordance with which charging of the energy storage device of the respective vehicle is intended to be begun immediately on connection of the vehicle to the power supply system and continued until a setpoint state of charge is achieved; and/or
- a setpoint state of charge which needs to be achieved by a departure time of the respective vehicle or up to which the respective vehicle charges maximally without specification of a departure time.

14. The central control system as claimed in claim 10, wherein in the event that the preset criterion has been met, the central control system is further configured to ensure that the power reduction operation in accordance with the reduction scheme with the participation of the respective vehicle in the power reduction operation, while adhering to the one or more altered parameter of the altered charging operation is no longer manipulated by the central control system such that the altered charging operation is altered again.

15. The central control system as claimed in claim 10, wherein the central control system, when performing a check to ascertain whether the preset criterion has been met, takes into consideration a buffer, which assumes a charging efficiency of the energy storage device of the respective vehicle which has been decreased in comparison with an expected charging efficiency in order to prevent the decrease in the power uptake of the plurality of vehicles in accordance with the reduction scheme with the participation of the respective vehicle in the power reduction operation, while adhering to the one or more altered parameter of the altered charging operation, being lower than the power amount in accordance with the received reduction command.

16. The central control system as claimed in claim 10, wherein a stationary energy storage device system is connected to the power supply system and is controlled by the central control system such that, in the event that the decrease in the power uptake of the plurality of vehicles by the power amount in accordance with the reduction command cannot be achieved exclusively by a temporary reduction in the charging power of the charging operation of the energy storage device of respective vehicles in the plurality of vehicles, the power uptake of the stationary energy storage device system from the power supply system is lowered or the power output of the stationary energy storage device system to the power supply system is increased, such that the decrease in the power uptake of the plurality of vehicles which is achieved by a temporary reduction in the charging power of the charging operation of the energy storage device of respective vehicles in the plurality of vehicles plus the amount by which the power uptake of the stationary energy storage device system is lowered or by which the power output of the stationary energy storage device system is increased corresponds to the power amount in accordance with the reduction command.

17. The central control system as claimed in claim 10, wherein the user interface by which the user of the respective vehicle can alter at least some of the one or more parameters of the charging operation is part of a mobile device or is integrated into the respective vehicle.

* * * * *